Oct. 19, 1965   G. V. BRYNSVOLD ETAL   3,212,991
CONTINUOUS SUPPORT FUEL ROD SPACER SYSTEM
Filed June 3, 1964
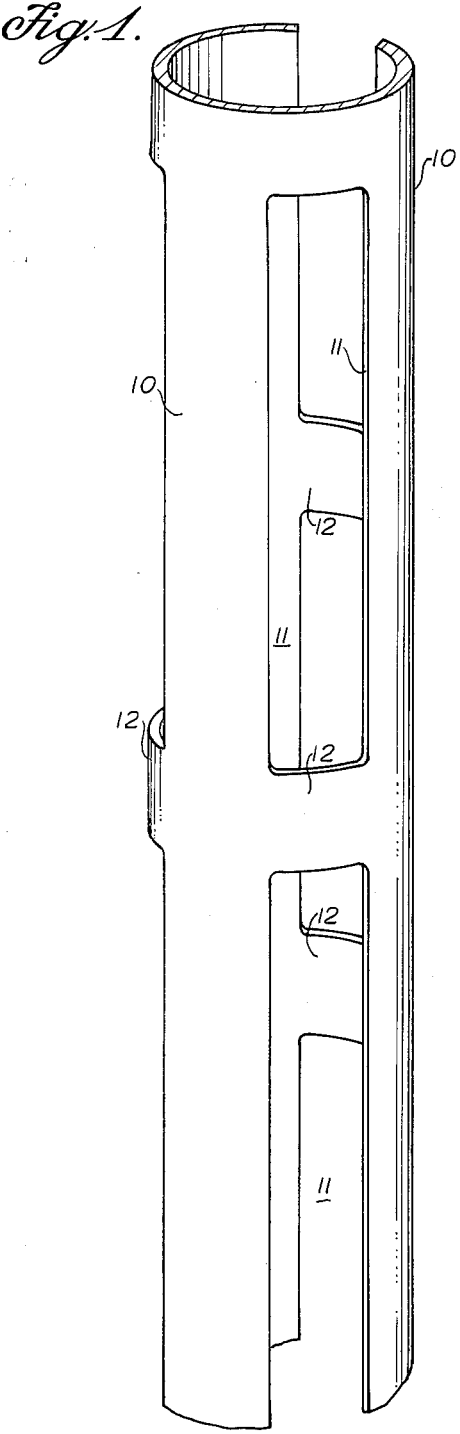
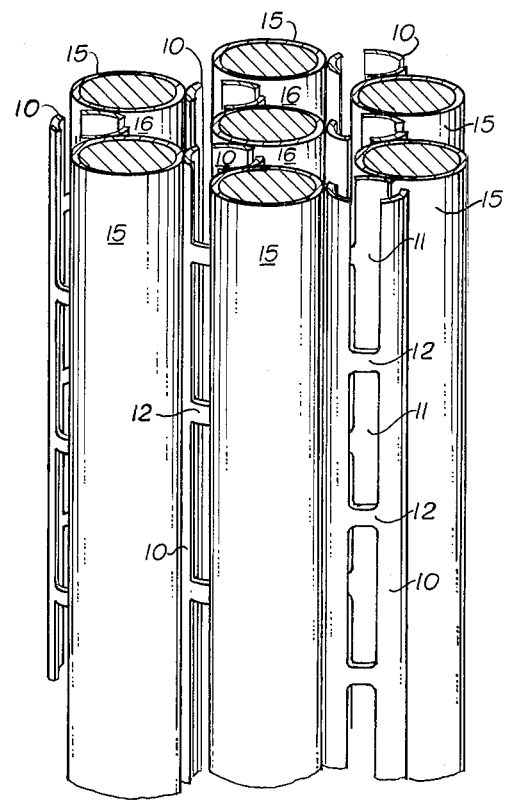
INVENTORS
GLEN V. BRYNSVOLD
WILLIAM A. SANGSTER
BY
ATTORNEY 3,212,991
CONTINUOUS SUPPORT FUEL ROD
SPACER SYSTEM
Glen V. Brynsvold and William A. Sangster, San Jose,
Calif., assignors to the United States of America as
represented by the United States Atomic Energy
Commission
Filed June 3, 1964, Ser. No. 378,091
9 Claims. (Cl. 176—78)

This invention relates to nuclear reactors and in particular to a means for providing continuous support to fuel elements which are, by the same means, held in spaced relationship within the core of the reactor.

In nuclear reactors having rod shaped or elongated fuel elements supported by end plates and where a liquid coolant flows around the outside of each element, the elongated element will tend to bow, warp or deform as operating temperatures are increased thus creating local and undesirable changes in reactivity and flow of liquid coolant. In some instances wire, tubing or the like is helically wound around the fuel elements to act as a spacing means. This method, whether arranged to simulate continuous fuel rod support or not, unfortunately results in appreciable head losses and pressure drop in the coolant flow system. In other instances, a helical wire spring, placed with its axis of revolution parallel to the longitudinal axis of the fuel element will operate satisfactorily as a spacer but, due to the profile drag of the wire, the head losses and pressure drop in the coolant flow system are appreciable. Moreover, with foregoing spacer systems there is often inadequate mixing of total coolant flow which permits the development of hot spots and reduced average temperature of output coolant.

For reactors operating at high temperatures, such as sodium cooled, fast breeder reactors, the flow of coolant through the reactor core must not in any way be impeded. At the high operating temperatures for fast reactors of the current art, any reduction in coolant flow may result in cooling voiding and coolant loss which would tend to create a dangerous reactivity condition. The spaced device of the present invention is essentially in the form of a tube having one continuous slot or a plurality of slots cut in the sides in a particular novel manner and adapted for disposition in the interstitial spaces between fuel elements to provide an elastic supporting action continuous along the length of the supported fuel element, and, at the same time, permit the fuel elements to expand and contract without losing support. In addition, the slot configuration is such as to result in reduced head losses and pressure drop in the coolant flow system within the reactor core and to promote effective mixing of the total coolant flow.

It is therefore an object of this invention to provide a device for supporting fissile fuel containing fuel elements in a nuclear reactor core continuous along its length.

It is a further object of this invention to provide a device whereby continuous support along the length of the fuel element is maintained during expansion and contraction of the element.

It is a further object of this invention to provide a spacer for a fuel element by which head losses and pressure drop in the coolant flow system are substantially reduced.

Other and more particular objects of this invention will be manifest upon a study of the following detailed description when taken together with the accompanying drawing, in which FIGURE 1 is an illustration of a typical spacer tube showing slot configuration; and FIGURE 2 is an isometric cutaway section through a typical reactor core showing the fuel element spacer in place.

Referring to FIGURE 1, the spacer tube of this invention comprises an elongated tube 10 having a plurality of linearly and circumferentially spaced elongated slots 11 parallel to the longitudinal axis of tube 10, each slot having a length substantially, i.e., several times, greater than its width. It will be noted that radially adjacent slots are arranged in partially overlapping relation. Tube 10 may be of any material having resistance to at least temperatures encountered in sodium cooled fast reactors while maintaining its elasticity to an appreciable degree. Typical of materials that may be used are stainless steel, zirconium alloys, or the like and the spacer construction permits construction using a minimal amount of neutron absorbing material. Said slots 11 in the preferred embodiment are also arranged so that inter-end spaces 12 lie proximate the center of slots immediately adjacent. Said slots 11 can also be arranged in a similar parallel pattern but aligned helically around rather than longitudinally parallel to the axis of tube 10. An additional slot may also be provided along the full length of tube 10 analogous to a split ring.

In the case of a plurality of slots linearly and circumferentially spaced, the width of material disposed between slots necessary to result in a particular deflection generally depends upon the wall thickness of the tube, modulus of elasticity of the tube material and radial forces on the tube exerted by the fuel element. Such determination can easily be made using equations and calculations known to persons of normal skill in the art. It should be noted also that varying the overlap of radially adjacent slots will result in appreciable variation of the effective spring constant of the spacer. For most applications the space between slots should be approximately equal to the width of the slot and the spacers of a length approximating that of the fuel elements to be supported.

In the preferred embodiment of this invention, three rows of slots are used. Also, the spacer is particularly adapted for use in a reactor core in which the fuel elements are disposed in a triangular pitch pattern. When placed in such a reactor core (FIGURE 2), each spacer, for this embodiment is disposed in an alternate interstice between the fuel elements 15 to support three fuel element rods. The spacers are placed so that inter-end space 12 and the rows of slots 11 provide open communication between adjacent interstitial spaces 16 and are thereby situated between the contact points of tube 10 and adjacent pairs of fuel elements 15. A nominal one to one spacer to fuel element ratio is thereby obtained. Thus a continuous line of support is maintained along three equally spaced portions of fuel element rod 15. As rods 15 expand and contract, the middle portion of slot 11 adjacent inter-end spaces 12 on each side will move circumferentially together and apart respectively opposed and assisted by the spring action of the strip of tube 10 between slots 11 as though the spacer were a split tube spring. Should the spacer tube be placed with inter-end space 12 in contact with fuel rod 15, rod 15 will still be supported although at fixed points, but there will still be a springing action against the rod by virtue of the springing action of the strip of the tube 10 between slots 11; however, communication and intermixing between interstitial spacers is reduced. With spirally arranged slots, communication between interstices cannot be hampered, some vortical flow is imparted to the coolant to improve mixing and no special alignment is needed. By using longitudinal slots which are parallel to the flow of coolant through the reactor core, head losses and pressure drop due to friction and turbulence are reduced. Further reductions in head loss and pressure drop can be achieved through streamlining the ends of slots 11 and portion of the spacer disposed transverse to the line of flow.

Since the slot length in the spacer is large compared to its diameter, it will behave structurally as a continuously slotted tube and as such can be analyzed as a split ring. The following is a simplified expression for the deflection:

$$\delta = 15.1 \frac{Pr}{Et^3}$$

where $\delta$ = deflection
$P$ = *load per unit length*
$E$ = *Modulus of elasticity*
$r$ = *spacer radius*
$t$ = *spacer thickness*

Assuming an allowable stress of 20,000 p.s.i. and a spacer tube of 0.070 inch radius by 0.005 inch wall thickness, the allowable load and deflection are 1.3 lbs./inch of spacer length and 0.0027 inch respectively. The above deflection is for the point of application of one load with respect to another so with three equally spaced loads, 1.3 lbs./inch each, the net reduction in radius of the spacer is approximately 0.0015 inch.

The spacers can be loaded beyond their yield strength upon assembly and thereby yield slightly to compensate for manufacturing tolerances.

This leaves only the differential thermal expansion of components within the fuel assembly to be accounted for by the spring action of the spacer. The load and deflection permissible without exceeding the yield strength (1.3 lbs./inch of spacer length and a reduction of spacer radius of 0.0015 inch) are more than adequate for this purpose.

Although the foregoing embodiment has been described in detail, there are obviously many other embodiments and variations in configuration which can be made by a person skilled in the art without departing from the spirit, scope or principle of this invention. Therefore, this invention is not to be limited except in accordance with the scope of the appended claims.

What is claimed is:

1. In combination with a nuclear reactor core having an ordered array of cylindrical fuel elements therein, fuel rod spacers comprising an elongated tube having a plurality of slots in the wall of said tube aligned and arranged parallel to the longitudinal axis of said tube, said slots arranged in radial overlapping relation, said tubes arranged in the interstitial spaces in tangential contact with fuel elements in said nuclear reactor to space and provide continuous support along the length of said fuel elements.

2. Fuel element spacers as defined in claim 1 wherein said slots are provided with a length at least several times their width.

3. Fuel element spacers as defined in claim 1 wherein said plurality of slots is arranged in at least three longitudinal rows equally spaced circumferentially around the longitudinal axis of said elongated tube.

4. Fuel element spacers as defined in claim 1 wherein said slots are at least as wide as the space between said slots.

5. Fuel element spacers as defined in claim 1 wherein said slots are arranged in helical parallel rows.

6. In combination with a nuclear reactor core having a triangular pitch ordered array of cylindrical fuel elements therein, fuel rod spacers comprising an elongated tube having a plurality of slots in the wall of said tube aligned and arranged parallel to the longitudinal axis of said tube, said slots arranged in radial overlapping relation, said tubes arranged in the interstitial spaces in tangential contact with fuel elements in said nuclear reactor to space and provide continuous support along the length of said fuel elements.

7. Fuel element spacers as defined in claim 6 wherein said plurality of slots is arranged in at least three longitudinal rows equally spaced circumferentially around the longitudinal axis of said elongated tube.

8. Fuel element spacers as defined in claim 6 wherein said plurality of slots is arranged in at least three longitudinal rows equally spaced circumferentially around the longitudinal axis of said elongated tube, and oriented to provide communication between interstitial spaces in said core.

9. Fuel element spacers as defined in claim 6 wherein said slots are arranged in helical parallel rows.

References Cited by the Examiner

UNITED STATES PATENTS 3,049,485  8/62  Tatlock et al. _____ 176—76 X
3,070,534  12/62  Kooistra _____ 176—78

OTHER REFERENCES

AEC Document No. GEAP–3749, June 1961, pages 2 and 9.

CARL D. QUARFORTH, *Primary Examiner.*